W. H. JOHNSON.
GLOBE VALVE.
APPLICATION FILED AUG. 20, 1915.
1,177,337. Patented Mar. 28, 1916.
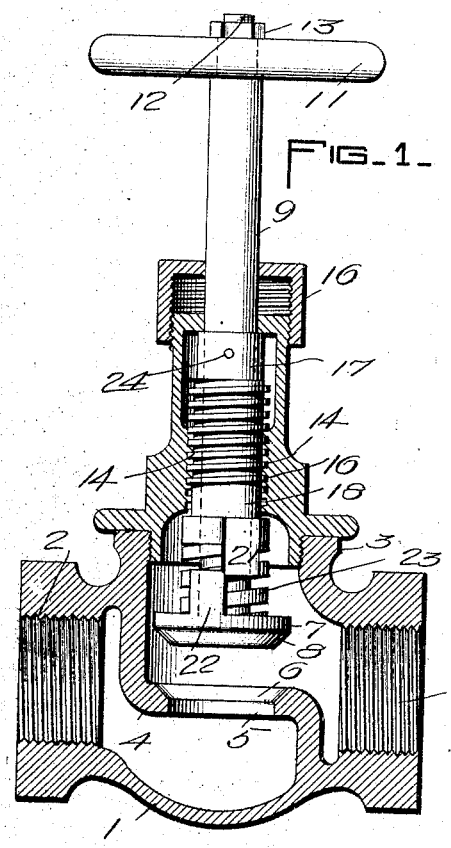
FIG. 1.
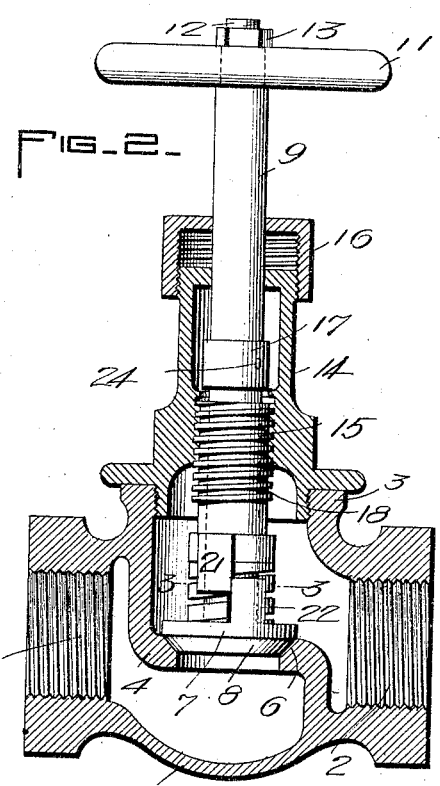
FIG. 2.
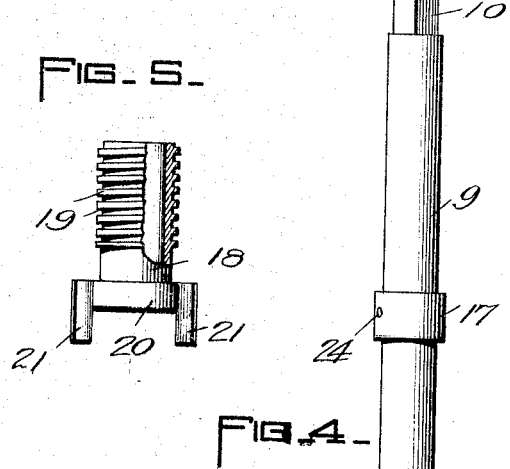
FIG. 5. FIG. 4.
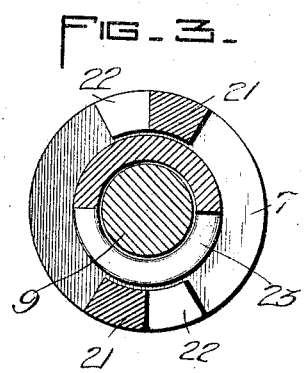
FIG. 3.
WITNESSES:
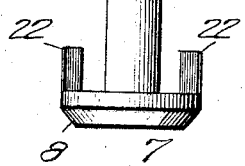
INVENTOR
WILLIE H. JOHNSON,
BY Munn & Co.
ATTORNEYS

UNITED STATES PATENT OFFICE.

WILLIE HARRY JOHNSON, OF CHICAGO, ILLINOIS, ASSIGNOR OF ONE-HALF TO FREDERICK GUTH, OF CHICAGO, ILLINOIS.

GLOBE-VALVE.

1,177,337.  Specification of Letters Patent.  Patented Mar. 28, 1916.

Application filed August 20, 1915. Serial No. 46,519.

*To all whom it may concern:*

Be it known that I, WILLIE HARRY JOHNSON, a citizen of the United States, and a resident of Chicago, in the county of Cook and State of Illinois, have invented certain new and useful Improvements in Globe-Valves, of which the following is a specification.

My invention is an improvement in globe valves, and the invention has for its object to provide a valve of the character specified, so arranged that whenever the valve is opened or closed, it will be turned or ground on its seat, to provide for an intermittent regrinding on the contact surfaces of the valve and seat, and wherein the grinding pressure is for a portion of the time during the opening and closing of the valve under full pressure.

In the drawings: Figure 1 is a vertical section showing the valve in open position; Fig. 2 is a similar view, showing the valve in closed position; Fig. 3 is a section on the line 3—3 of Fig. 2; Fig. 4 is a front view of the valve and stem, and Fig. 5 is a similar view of the threaded sleeve, with parts in section.

In the present embodiment of the invention a valve casing 1 is provided, having its ends internally threaded at 2, and having a nipple 3 at its top and intermediate its ends, the said nipple being also internally threaded. The valve casing has the usual diaphragm 4, a portion of which is in a plane through the axis of the casing, and this portion of the diaphragm has the seat 5 for the valve.

The seat is beveled or counter-bored at its upper end, as indicated at 6, and the valve 7 is shaped to fit the seat, that is, the valve has a beveled portion 8 which coöperates with the beveled portion 6 of the seat. The valve is on the lower end of the stem 9, and this stem has the usual reduced polygonal portion 10 for receiving the hub of a hand wheel 11 and a threaded axial stem 12 above the polygonal portion for receiving a nut 13 to hold the hand wheel in place.

A casing 14 is threaded into the nipple 3, and this casing has an internally threaded portion 15 near the end which engages the nipple. The stem 9 extends through the casing 14, and out at the upper end thereof, and a packing nut or stuffing box 15 is threaded onto the upper end of the casing, to make a fluid tight joint.

A collar 17 is secured to this stem intermediate its ends and just above the threaded portion 15 when the stem is in place, and this collar is a limiting member to limit the upward movement of a sleeve 18 which is mounted on the stem between the valve and the collar. The sleeve has a coarse spiral thread 19, and the thread 15 is of the same pitch as the thread 19, and coöperates therewith to constrain the sleeve to move longitudinally of the casing 14, when the sleeve is turned with respect to the casing. This sleeve 18 has a head 20 at its lower end, and the head is provided with oppositely arranged lugs 21, the said lugs extending parallel with the axis of the stem 9. The valve 7 is also provided with lugs 22, the said lugs extending upwardly, and being adapted to engage the lugs 21 of the sleeve 18, under conditions to be presently described. A coil spring 23 encircles the stem between the head 20 of the sleeve and the valve 7, and the spring acts normally to press the valve on its seat.

The operation of the improvement is as follows: With the parts in the position of Fig. 1, when it is desired to close the valve the hand wheel 11 is turned to the left. The lugs 22 on the valve will engage the lugs 21 on the sleeve, and the sleeve will be rotated in a direction to cause it to move downward. As the sleeve moves downward, the valve will also move downward until it engages its seat. After the valve is engaged with its seat it must be turned further in order to provide sufficient compression to the spring 23 to prevent leakage, and during this turning of the valve, it is ground on its seat, being held tight on the seat by the compressed spring 23.

With the parts in the position of Fig. 2, that is, with the valve closed, to open the valve the hand wheel 11 is turned to the right. The first movement of the hand wheel grinds the valve on its seat, under full pressure of the spring 23, and this grinding operation continues until the sleeve 19 engages the collar 17. A continuation of the turning movement of the stem moves the sleeve 18 upward, thus relieving the tension of the spring 23, but the grinding operation on the valve continues under gradually decreasing pressure, until the valve leaves its seat. The upward movement of the sleeve 18 lifts the valve through the engagement of the upper end of the sleeve with the collar 17, and this collar is pinned to the stem as indicated at 24.

Whether opening or closing the valve, there is always a grinding movement of some extent under the full compression of the spring 23, and a further grinding movement gradually increasing in intensity during the closing of the valve and gradually decreasing in intensity during the opening of the valve, and because of this grinding movement the valve and its seat will wear away uniformly, so that the contact surfaces will always fit perfectly and truly to prevent any leakage past the valve.

The valve is opened and closed in precisely the same manner as the ordinary globe valve, by turning the stem in opposite directions, and no further movement of the stem is required to open or close the valve than with the ordinary form of valve, except for the partial movement required before the lugs 22 engage with the lugs 21, and this movement is less than a half rotation of the stem.

I claim:

1. A valve of the character specified, comprising a casing having a beveled seat, a valve having a beveled portion coöperating with the seat, a stem secured to the valve, a casing detachably connected with the valve casing and having an internal thread, the stem extending through the second mentioned casing, a sleeve having a thread coöperating with the thread of said second-mentioned casing and encircling the stem, a coil spring encircling the stem between the valve and the adjacent end of the sleeve, said valve and sleeve having oppositely arranged lugs adapted to engage with each other when the stem is turned to constrain the sleeve to move with the stem in either direction, and means on the stem for engagement by the upper end of the sleeve to lift the valve when the sleeve is moved upward.

2. A valve of the character specified, comprising a casing having a beveled seat, a valve having a beveled portion coöperating with the seat, a stem secured to the valve, a casing detachably connected with the valve casing and having an internal thread, the stem extending through the second mentioned casing, a sleeve having a thread coöperating with the thread of said second-mentioned casing and encircling the stem, a coil spring encircling the stem between the valve and the adjacent end of the sleeve, said valve and sleeve having a lost motion connection with each other for permitting one of them to move a limited distance relatively to the other and for then constraining them to move together, and means on the sleeve to lift the valve when the sleeve is moved upward.

3. A valve of the character specified, comprising a casing having a beveled seat, a valve having a beveled portion coöperating with the seat, a stem secured to the valve, a casing detachably connected with the valve casing and having an internal thread, the stem extending through the second mentioned casing, a sleeve having a thread coöperating with the thread of said second-mentioned casing and encircling the stem, and a coil spring encircling the stem between the valve and the adjacent end of the sleeve, said valve and sleeve having a lost motion connection with each other for permitting one of them to move a limited distance relatively to the other and for then constraining them to move together.

4. A valve of the character specified, comprising a casing having a seat and a valve for seating on the seat, a stem secured to the valve, a sleeve encircling the valve stem and having a threaded engagement with the casing for constraining the sleeve to move longitudinally when it is rotated, a spring arranged between the valve and the sleeve, and a lost motion connection between the stem and the sleeve for permitting a limited angular movement of the said stem with relation to the sleeve and for then constraining them to rotate together.

5. A valve of the character specified, comprising a casing having a seat, a valve coöperating with the seat, means for rotating the valve, a spring pressing the valve toward the seat, an operating member for the valve having a threaded engagement with the casing to constrain the said member to move longitudinally when it is rotated, and a lost motion connection between the operating member and the rotating means for the valve for permitting a limited relative movement of the said operating member and the valve, said valve and the said member being afterward constrained to move together.

6. A valve comprising a casing having a seat, a valve coöperating with the seat, an operating member for the valve having a threaded engagement with the casing, a spring between the operating member and the valve and normally holding the valve on its seat, and a lost motion connection between the valve and the operating member.

7. In a valve, a casing provided with a seat, a valve coöperating with the seat, an operating member having screw thread engagement with the casing and a limited axial and rotative movement with reference to the valve, and a compressible spring between the valve and the operating member to press the valve on its seat during the final and the initial movements of the operating member to seat or unseat the valve.

WILLIE HARRY JOHNSON.

Witnesses:
  Louis Baler, Jr.,
  Louis O. Baler.